United States Patent [19]

Kanayama et al.

[11] Patent Number: 4,721,314

[45] Date of Patent: Jan. 26, 1988

[54] LIP SEAL DEVICE

[75] Inventors: Hiroshi Kanayama; Keiichi Shimasaki; Makoto Shibata, all of Aichi, Japan

[73] Assignee: Taiho Kogyo Co., Ltd., Aichi, Japan

[21] Appl. No.: 28,836

[22] Filed: Mar. 23, 1987

[30] Foreign Application Priority Data

May 2, 1986 [JP] Japan .................................. 61-102659

[51] Int. Cl.⁴ ............................................. F16J 15/32
[52] U.S. Cl. ........................................ 277/152; 277/166
[58] Field of Search ............... 277/152, 153, 166, 134, 277/186

[56] References Cited

U.S. PATENT DOCUMENTS

| 2,172,325 | 9/1939 | Victor et al. | 277/153 X |
| 2,478,140 | 8/1949 | Ulseth | 277/153 X |
| 3,099,454 | 7/1963 | Walinski | 277/153 X |
| 4,427,205 | 1/1984 | Holzer et al. | 277/134 |

*Primary Examiner*—Robert S. Ward
*Attorney, Agent, or Firm*—Sughrue, Mion, Zinn, Macpeak & Seas

[57] ABSTRACT

A lip seal device for a rotary shaft in which an annular metal casing has a cross section almost in a box shape except for a radially and axially inward gap. A seal member fills most of the box. A spacer and a radially outer portion of a lip seal, contacting the rotary shaft at its inner portion, are sandwiched in the gap between a radial wall of the casing on one side and the seal member and an end of the inner axial wall of the casing.

18 Claims, 8 Drawing Figures

LIP SEAL DEVICE

BACKGROUND OF THE INVENTION

1. Field of the Invention

The present invention relates to a seal device. Particularly, it relates to a seal device provided with a lip seal which is brought into slidable contact with a rotary shaft at an outer circumference thereof.

2. Background of the Invention

Conventionally, a seal device provided with a lip seal for slidably contacting a rotary shaft has been known. An example of such a seal device comprises a casing surrounding a circumference of a rotary shaft, a seal member attached to the casing, and a lip seal sandwiched at its outer circumferential portion between the seal member and a spacer supported by the casing. The lip seal is in slidable contact at its inner circumferential surface with an outer circumferential surface of the rotary shaft to thereby seal the contacting portion therebetween (Japanese Patent Publication No. 721/1967, see FIG. 8 thereof).

In the case where the lip seal is sandwiched between the seal member and the spacer, however, the lip seal can be securely sandwiched in comparison with the case where the seal member is omitted. As a result, a sealed fluid which is apt to leak through a gap between the spacer and the lip seal and through a gap between the lip seal and the seal member can be effectively prevented from leaking. However, when the seal member ages, its elasticity is reduced due to its long use or the like. As a result, the lip seal is often rotated as the rotary shaft rotates due to a frictional force between the lip seal and the rotary shaft. The rotation of the lip seal sometimes allows the sealed fluid to leak out through a gap between the lip seal and the seal member.

SUMMARY OF THE INVENTION

Accordingly, an object of the invention is to provide a lip seal resistant against leaks arising from reduced elasticity.

The seal device according to the present invention includes a casing having an axial section composed of an inner-circumferentially axially extending portion disposed at an inner circumferential side and extended axially, a first radially extending portion extended radially outwards from an end portion of the inner-circumferentially axially extending portion, an outer-circumferentially axially extending portion extended outer-circumferentially in parallel with the inner-circumferentially axially extending portion from an radially outer end portion of the first radially extending portion, and a second radially extending portion extended radially inwards from an end portion of the outer-circumferentially axially extending portion. The seal member is accommodated in a space surrounded by the inner-circumferentially axially extending portion, the first radially extending portion, and the outer-circumferentially axially extending portion. The spacer is supported by the second radially extending portion so that the lip seal is sandwiched between the seal member and the spacer. The lip seal is also sandwiched between the other end portion of the inner-circumferentially axially extending portion and the spacer.

Further, in order to prevent a sealed fluid from leaking through a gap between the lip seal and the seal member, a projecting portion toward the lip seal is formed circumferentially continuously on a portion of a support surface of the seal member where the seal member and the lip seal are in contact with each other.

According to such an arrangement, not only the sealed fluid can be well prevented from leaking by means of the seal member, but also, because the lip seal is sandwiched also between the other end portion of the inner-circumferentially axially extending portion and the spacer, the sandwiched state of the lip seal is well maintained even if the seal member has aged to lower its elasticity. Accordingly, the lip seal can be well prevented from rotating as the rotary shaft rotates even if the frictional force between the lip seal and the rotary shaft becomes comparatively large. Since the projecting portion formed on the support surface at a portion thereof comes to be elastically deformed relatively more than the other portions in the case where the lip seal is sandwiched by a whole of the support surface of the seal member, the contacting state between the projecting portion and the lip seal can be well maintained even if a whole of the seal member has aged to lower its elasticity, so that the sealed fluid can be prevented from leaking stably for a long time.

DETAILED DESCRIPTION OF THE INVENTION

Figure 1:
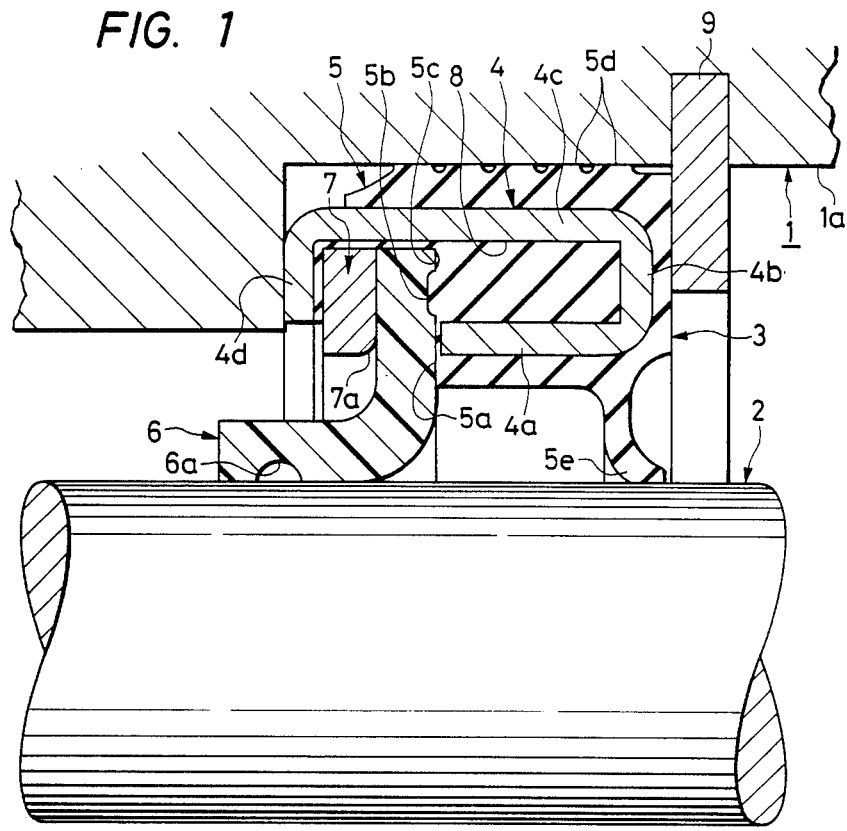
FIG. 1 is a section showing a first embodiment according to the present invention.

Referring to the drawings, a first embodiment according to the present invention will be described hereunder.

In FIG. 1, a rotary shaft 2 is rotatably supported in a stepped hole 1a formed in a housing 1. A seal device 3 according to the present invention is provided between the housing 1 and the rotary shaft 2. The seal device 3 is constituted by four members, that is, a metal casing 4, a seal member 5 made of rubber or synthetic resin, a lip seal 6, and a spacer 7 made of metal.

The casing 4 is shaped ring-like so as to surround the rotary shaft 2. The axial section of the casing 4 is composed of an inner-circumferentially axially extending portion 4a disposed at an inner circumference of the casing 4 and extended axially. A first radially extending portion 4b of the casing 4 extends radially outwards from the right end portion of the inner-circumferentially axially extending portion 4a. An outer-circumferentially axially extending portion 4c of the casing 4 extends outer-circumferentially in parallel with the inner-circumferentially axially extending portion 4a from a radially outer end portion of the first radially extending portion 4b. A second radially extending portion 4d of the casing 4 extends radially inwards from the left end portion of the outer-circumferentially axially extending portion 4c. The section is generally shaped in the form of a substantially rectangular ring which is broken at the left end portion of the inner circumference thereof.

Figure 2:
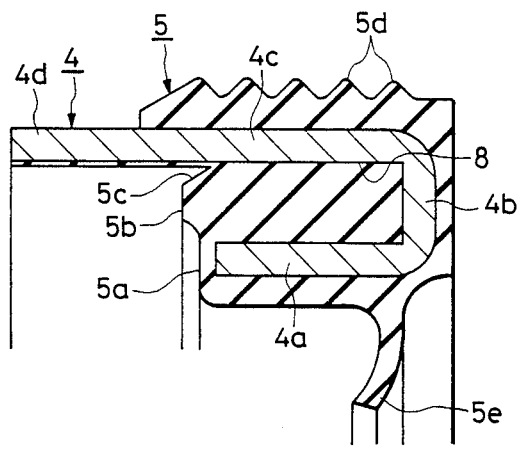
FIG. 2 is a section showing the main portion of FIG. 1 in a not-yet assembled state.

In the state as shown in FIG. 2, before the casing 4 is assembled as a part of the seal device 3, the second radially extending portion 4d is extending in the direction of the same axis as that of the outer-circumferentially axially extending portion 4c so that it is possible to form the section of such a rectangular ring which is broken at its inner-circumferential left portion as described above by radially inwards bending the second radially extending portion 4d.

The seal member 5 is integrally attached to the casing 4 through vulcanization or through bonding so as to continuously cover the outside portion of the outer-circumferentially axially extending portion 4c, the outside portion of the first radially extending portion 4b, and the inside position of the inner-circumferentially axially extending portion 4a but without covering the outside portion of the second radially extending portion 4d. Furthermore, the attachment of the seal member 5 fills the inside of a casing inner circumferential portion 8 surrounded by the inter-circumferentially axially extending portion 4a, the first radially extending portion 4b, and the outer-circumferentially axially extending portion 4c. Further, the seal member 5 continuously covers the left portion of the inside of the outer-circumferentially axially extending portion 4c and the inside of the second radially extending portion 4d connected to the outer-circumferentially axially extending portion 4c.

A support surface 5a is formed at the left end surface of the seal member 5 which fills an inner circumferential portion 8 of the casing 4. The lip seal 6 is sandwiched at its outer-circumferentially radially extending portion between the support surface 5a and the spacer 7 in the state in which the outer-circumferentially radially extending portion of the lip seal 6 is turned in the direction perpendicular to the axial direction. The spacer 7 is supported at its left end surface by the radially inwards bent second radially extending portion 4d of the casing 4.

If the spacer 7 is used here, the lip seal 6 can be pressed easily with an even pressure so as to annularly abut over the entire circumference between the seal member 5 and the lip seal 6 to thereby easily obtain a satisfactory seal property. Accordingly, it is preferable to use the spacer 7. Further, the spacer 7 can be used as a fulcrum for bending the second radially extending portion 4d of the casing 4 during assembly, so that the bent portion can be easily and accurately formed. Therefore, it is possible to easily obtain a stable retaining force to thereby maintain a high seal property. Alternatively, in place of the spacer 7, the second radially extending portion 4d of the casing 4 may be bent accurately in plane so as to sandwich the lip seal 6 although the work on the second radially extending portion 4d is of course somewhat difficult. On the other hand, it is preferable to form a curved surface portion 7a at the radially inner side of the spacer 7, at the side where the spacer 7 comes into contact with the lip seal 6. The curved surface portion 7a serves to prevent the lip seal 6 from being damaged or broken, so that life of the seal device can be further prolonged.

An inner circumferential portion of the lip seal 6 is bent to the left to project outwards and its right end surface is brought into elastic contact with the rotary shaft 2 at its outer circumferential surface. Due to elasticity of the lip seal 6 itself, a sealed fluid on the left of the lip seal 6 is prevented from leaking to the atmosphere on the right side. A circumferentially extending annular groove 6a is formed in a surface of the lip seal 6 which is brought into sliding contact with the rotary shaft 2 so as to reserve any leaking sealed fluid in the annular groove 6a so that the sealed fluid can be well prevented from leaking.

A circumferentially continuous and axially projecting portion 5b of the seal member 5 projected toward the lip seal 6 is provided on a part of its support surface 5a for supporting the foregoing lip seal 6 and at a position radially further outwards than the inner-circumferentially axially extending portion 4a of the casing 4, as shown in FIGS. 1 and 2. An annular groove 5c is formed in the seal member 5 at a position radially further outwards than but closely adjacent to the projecting portion 5b.

In this case, it is preferable to make the annular groove 5c somewhat deeper than the support surface 5a. More preferably, the annular groove 5c is made a little deeper than the front end portion of the inner axially extending portion 4a of the casing 4. This is because the amount of escape of the elastomer can be sufficiently secured when the projecting portion 5b is elastically deformed.

Thus, the projecting portion 5b of the support surface 5a of the seal member 5 is relatively larger than the other portions of the support surface 5a and besides the lip seal 6 is smoothly elastically deformed while partially swelling into the annular groove 5c when the lip seal 6 is sandwiched between the support surface 5a and the spacer 7. As a result, the contacting condition between the projecting portion 5b and the lip seal 6 is well maintained even if the seal member 5 has aged and has reduced elasticity. Therefore, the seal fluid can be well prevented for a long time from leaking through any gap between the spacer 7 and the left end surface of the lip seal 6 or through a gap between the right end surface of the lip seal 6 and the support surface 5a of the sealing member 5.

In addition to the above, the lip seal 6 is sandwiched between the spacer 7 and the left end surface of the inner-circumferentially axially extending portion 4a of the casing 4 at a position axially further inwards than the projecting portion 5b of the seal member 5. As a result, the sandwiched state can be kept constant even if the seal member 5 has aged. Accordingly, it is possible to prevent occurrence of such a state that the force for sandwiching the lip seal 6 is lowered owing to the aging of the seal member 5 which would allow the lip seal 6 to rotate as the rotary shaft 2 rotates.

Thus, in the case where the lip seal 6 is arranged to be sandwiched between the spacer 7 and the left end surface of the inner-circumferentially axially extending portion 4a of the casing 4, the seal 6 can be strongly sandwiched at a position closest to the rotary shaft 2, more specifically at the innermost end position of the spacer 7. Therefore, it is possible to prevent the occurrence of such a problem that the bent portion of the lip seal 6 is apt to be transformed to thereby axially displace the sliding contact surface of the lip seal 6 contacting with the rotary shaft 2 to make the slide contact surface rough or to lower the endurance of the lip seal 6. This axial displacement would occur, for example, when the lip seal 6 is sandwiched at a position further outwards than an intermediate portion of the spacer 7.

In this embodiment, although the seal member 5 is provided on the left end surface of the inner-circumferentially axially extending portion 4a of the casing 4, the thickness of the seal member 5 at that portion is as thin as 0.1 to 0.5 mm in thickness so that the sandwiching force of the seal member 5 is never substantially lowered even if the seal member 5 has aged. Besides, the thin seal member 5 can prevent the lip seal 6 from being injured by the left end surface of the inner-circumferentially axially extending portion 4a when it is made of metal.

Next, a plurality of circumferentially continuous annular protrusions 5d are formed at predetermined intervals on the seal member 5 at a portion thereof covering the outer-circumferential side portion of the outer-circumferentially axially extending portion 4c of the casing 4. As shown in FIG. 1, the annular protrusions 5d are pressed into an inner-circumferential surface of the stepped hole 1a of the housing 1 so that liquid tightness at that portion can be maintained.

A radially inward extending dust lip 5e is formed integrally on the seal member 5 at the right end side of a portion of the seal member 5 covering the inner-circumferential side of the inner-circumferentially axially extending portion 4a of the casing 4. Although the dust lip 5c is bent so that the right side end surface thereof is made to be a projecting side thereof, as shown in FIG. 2 in a natural state, the dust lip portion 5e is bent in assembly so that its left side end surface is made to project toward the outer-circumferential surface of the rotary shaft 2, as shown in FIG. 1, when the seal device 3 is incorporated into the housing 1. As a result, an inner circumferential portion of the dust lip 5e is brought into elastic contact with the outer-circumferential surface of the rotary shaft 2 owing to the restoration force of the dust lip 5e itself to thereby prevent dust contained in the air from invading into the respective slide contact surfaces of the lip seal 6 and the rotary shaft 2.

In the arrangement described above, the seal device 3 may be assembled such that the out-circumferential right end surface of the lip seal 6 is caused to abut on the support surface 5a of the seal member 5, the spacer 7 is caused to abut on the outer-circumferential left end surface of the lip seal 6, and the second radially extending portion 4d of the casing 4 is bent radially inwards to support the spacer 7 at its left end surface in the state where the spacer 7 is pressed against the lip seal 6 with a predetermined pressure.

Next, after having been assembled in such a manner as described above, the seal device 3 is pressed, as shown in FIG. 1, into a large diameter portion of the stepped hole 1a of the housing 1 so as to make the left end surface of the second radially extending portion 4d of the casing 4 abut against an end surface of the step portion of the stepped hole 1a. Also, a stopper ring 9 is attached to the housing 1 to prevent the seal device 3 from escaping the stepped hole 1a. The seal device 3 is thus mounted in the stepped hole 1a so as to cause the annular protrusions 5d of the seal member 5 to seal the gap between the casing 4 and the stepped hole 1a and so as to cause the respective inner-circumferential portions of the lip seal 6 of the seal device 3 and the dust lip portion 5e to come into elastic contact with the outer circumferential surface of the rotary shaft 2 to seal the contacting portions. Thus, the attachment of the seal device 3 is completed.

Figure 3:
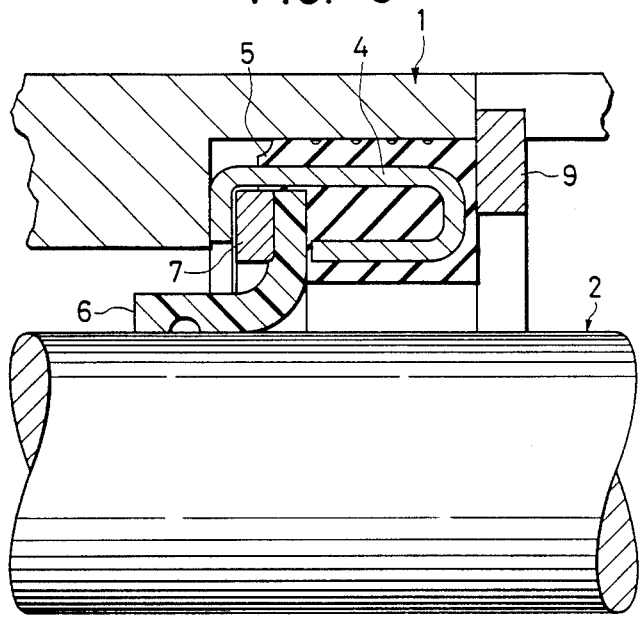
FIG. 3 is a section showing a second embodiment of the invention.
Figure 4:
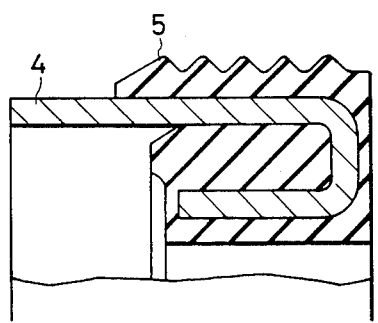
FIG. 4 is a section showing the incompletely assembled state of the embodiment of FIG. 3.

Another embodiment of the invention is illustrated in its assembled state in FIG. 3 and in its partially fabricated state in FIG. 4. The primary difference of the second embodiment is that it lacks a dust lip.

Figure 5:
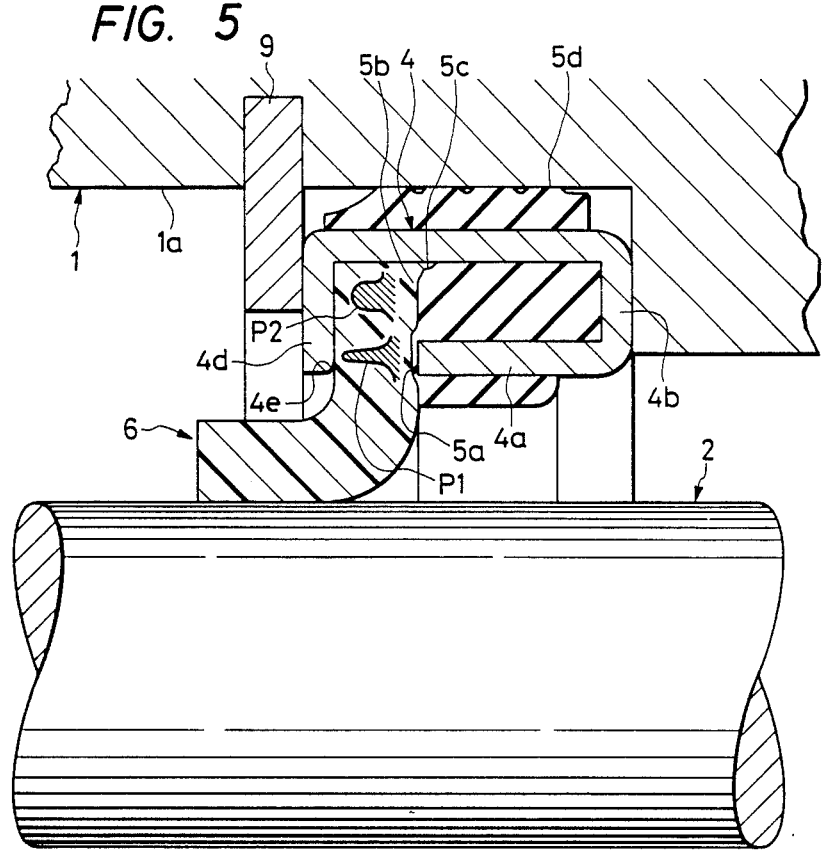
FIG. 5 is a section along a third embodiment of the invention.
Figure 6:
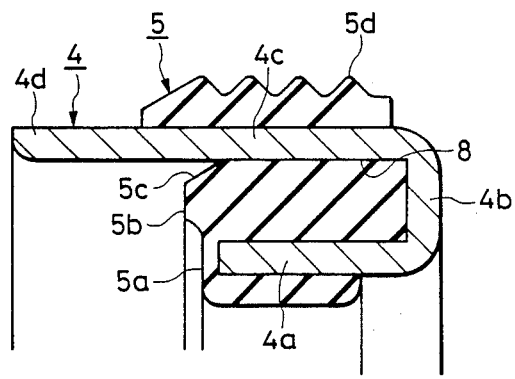
FIG. 6 is a section showing the incompletely assembled state of the embodiment of FIG. 5.

FIG. 5 shows a third embodiment of the present invention in an assembled state while FIG. 6 shows the same embodiment in a partially fabricated state. The third embodiment is different from the first embodiment in that the dust lip 5e and the spacer 7 are omitted, that the seal member 5 is smaller, (that is, the third embodiment omits a part of the seal member 5 at the outside of the first radially extending portion 4b and between the annular projecting portion 5d and the support surface 5a), and that the second radially extending portion 4d of the casing 4 is arranged so as to directly touch the stopper ring 9. Also, the third embodiment is different from the first embodiment in that a curved surface portion 4e is provided on the casing 4 in place of the curved surface portion 7a of the spacer 7, that the part of the seal member 5, between the annular groove 5c and the front portion of the second radially extending portion 4d is omitted, and that the lip seal 6 is made a little thicker.

In this embodiment, since the seal member 5 does not exist at the outside of the first radially extending portion 4b and between the annular projection portion 5d and the support surface 5a, it is desirable that the axial position of the stopper ring 9 is set accurately and that the casing 4 is securely fit in the axial direction during the axial direction assembly work of the seal device. The reason is as follows. In the first two embodiments (FIGS. 1 and 3), the seal member 5 has added parts so that the axial movement of the stopper ring 9 is absorbed by an elastic force to allow the stopper ring 9 to be comparatively roughly positioned. Also, even in the case where the seal member 5 is partially worn off at its outer peripheral part due to long time use, the abovementioned added parts of the seal member 5 can compensate for the abrasion. On the contrary, such functions as described above cannot be expected in the third embodiment. Similarly to this, in the viewpoint the action for preventing the whole seal device from rotating together with the rotary shaft is carried out only by the outer-circumferentially provided part of the seal member 5, known fixing elements such as check pins or the like for fixing the casing and the housing to each other may be additionally provided if necessary, so long as an increase in cost as well as in complexity of the structure may be endured. The outer circumferential part of the sealing member 5 may be modified within the scope of the present invention, for example, such that an O-ring is inserted in the housing 1 or sealing resin is applied onto the outer circumference of the casing 4 (in plane through baking finish). However, in the viewpoint of the sealing property between the housing and the casing, and the stability in effect of preventing the seal device from rotating together with the rotary shaft, it is rather preferable to form the outer-circumference portion 5d of the seal member 5 as provided in the foregoing embodiments.

The omitted part of the seal member 5 may be modified variously within the scope of the present invention. This is because the pressure portion is formed so that it is possible to obtain the sealing property superior to tha in the prior art.

That is, the seal member 5 may lack a part from the main seal portion to the front end portion of the second radially extended portion 4d of the casing 4. In the case where the support surface 5a is provided, the projecting portion 5b may be omitted. In the case where the projecting portion 5b is provided, the projecting portion 5b may be formed so as not to cover the front end portion of the exially extending portion 4a of the casing 4. It is a matter of course that it is preferable to form such omitted parts of the seal member 5 because the sealing property or the like can thereby be further improved.

The functions owing to the provision of such a pressure portion will be described in detail.

In FIG. 5, P1 and P2 show distributions of pressing and projecting pressure generated during assembly at the support surface 5a and at the projecting portion 5b.

The supporting pressure P1 has a steep-peak shape from the axial extending portion 4a toward the second radially extending portion 4d of the casing 4, so that it is clear that the lip seal 6 is apparently strongly sandwiched. Accordingly, it is possible to provide a high sealing property between the seal member 5 and the lip seal 6, and to to prevent the accompanying rotation of the lip seal 6 about the shaft 2.

The projecting pressure P2 has a shape having a specific width and a considerably high peak-shape because the projecting portion 5b of the seal member 5 is somewhat narrower in width than the first radially extending portion 4b of the casing 4. Accordingly, it is clear that the sealing pressure is high over part of the length of the sealing distance so that a high sealing property can be obtained.

Figure 7:
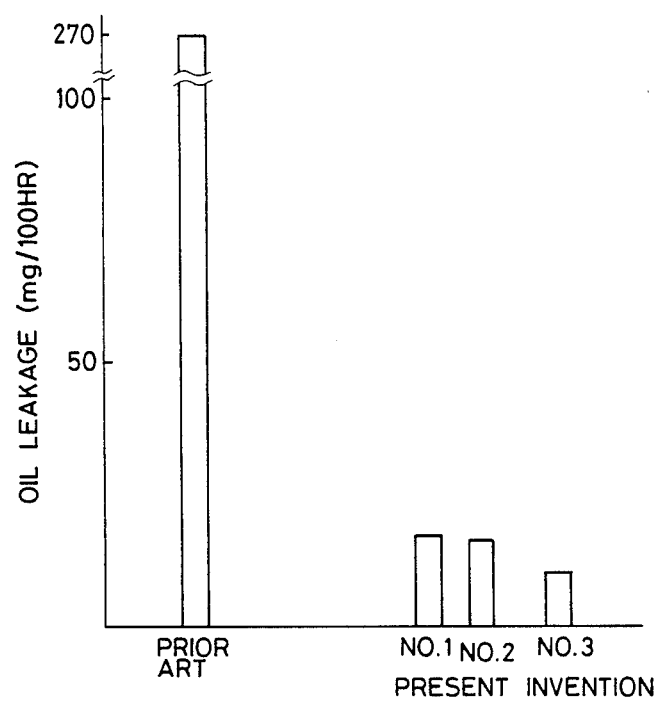
FIG. 7 is a graph showing a difference in seal performance between the seal device according to the present invention and the conventional one.
Figure 8:
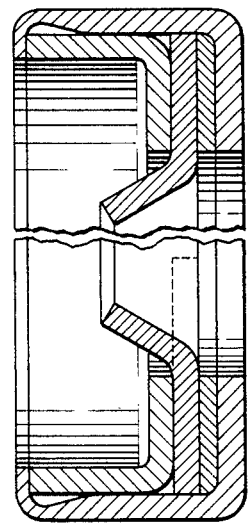
FIG. 8 is a section showing a conventional seal device (Japanese Examined Patent Application No. 721/1967).

FIG. 7 is a graph showing a difference in sealing performance between the seal device according to the present invention and the conventional one. The comparative examples were of the conventional seal device illustrated in FIG. 8. On the other hand Example No. 1 of the invention was the seal device in which only the projecting pressure P2 could be generated (only the projecting portion 5b of the seal member was provided). Example No. 2 is the seal device of the invention in which only the supporting pressure P1 could be generated (the projecting portion 5b was not formed but the support surface 5a of the seal member 5 was provided on the axially extended portion 4a of the casing 4). Example No. 3 is the seal device of the invention in which both the supporting pressure P1 and the projecting pressure P2 shown in FIG. 5 could be generated at the same time.

The test conditions were set as follows. The test was carried out by using a seal tester. As the sealed fluid, refrigerating machine oil and Freon gas R12 were sealed in the seal tester. The pressure was set to 2 kg/cm$^2$. The rotational rate of the shaft was 5000 rpm, and the ambient temperature was 100° C. The shaft roughness was 0.4 $\mu$mRa. The amount of oil leakage (mg/100 Hr) was measured at the passage of 100 hours.

The result of test proves that the seal devices according to the present invention have an excellent seal property and that the device of Example No. 3 had the best result.

As described above, according to the present invention, it is possible to obtain such an effect that a sealed fluid can be stably prevented from leaking out for a long time in comparison with the conventional device.

What is claimed is:

1. A seal device comprising:
   a casing surrounding a circumference of a rotary shaft;
   a seal member attached on said casing; and
   a lip seal sandwiched at its outer circumferential portion between said seal member and a spacer supported by said casing, said lip seal being in slidable contact at its inner-circumferential surface with an outer circumferential surface of said rotary shaft to thereby seal the contacting portion therebetween;
   wherein said casing in an axial section comprises a first section of an inner-circumferentially and axially extending portion disposed at an inner circumferential side and extending axially, a second section of a first radially extending portion extended radially outwards from a first end portion of said first section, a third section of an outer-circumferentially and axially extending portion extending axially from a first end portion of said third section, in parallel with said first section from a radially outer end portion of said second section, and a fourth section of a second radially extending portion extended radially inwards from a second end portion of said third section;
   wherein said seal member has at least a ring-shaped seal portion accomodated between said first, second and third sections and confronted with said fourth section; and
   wherein said outer-circumferential portion of said lip seal is sandwiched between said seal portion and said fourth section and wherein said outer-circumferential portion at a side of said second section confronts said seal portion for sealing.

2. A seal device according to claim 1, wherein said seal portion has at least a ring-shaped pressing portion facing said fourth section, a width of said pressing portion is narrower than a width of a face of said seal portion, and said pressing portion presses said seal portion cooperating with said fourth section, and wherein said pressing portion of said seal member is a supporting surface, said supporting surface being disposed adjacent a free end portion of said first section and pressure being applied by said free end portion against said outer-circumferential portion of said lip seal.

3. A seal device according to claim 2, wherein said supporting surface is formed with said free end portion of said first section being covered by a first thin portion of said seal member, and pressure being applied by said free end portion of said first section cooperating with said fourth section.

4. A seal device according to claim 1, further comprising a spacer, said spacer being sandwiched between said fourth section and pressure being applied by said seal portion through said spacer cooperating with said fourth section.

5. A seal device according to claim 2, further comprising a spacer, said spacer being sandwiched between said lip seal and said fourth section and pressure being applied by said pressing portion through said spacer cooperating with said fourth section.

6. A seal device according to claim 3, further comprising a spacer, said spacer being sandwiched between said lip seal and said fourth section and pressure being applied by said pressing portion through said spacer cooperating with said fourth section.

7. A seal device according to claim 5, wherein a thin portion of said seal member is interposed between said free end portion of said first section and said lip seal, so that said lip seal is sandwiched between said free end portion of said first section and said spacer through said thin portion of said seal member.

8. A seal device according to claim 6, wherein a thin portion of said seal member is interposed between said free end portion of said first section and said lip seal, so that said lip seal is sandwiched between said free end portion of said first section and said spacer through said thin portion of said seal member.

9. A seal device according to claim 1, further comprising a housing with a stepped races for accommodating said seal member said casing.

10. A seal device according to claim 1, wherein said seal member has a plurality of circumferential protrusions on an outer surface thereof for compressibly contacting an inner circumferential surface of said recess and wherein said fourth section of said casing presses against an annular surface of said recess.

11. A seal device as recited in claim 1, wherein said seal member further comprises a radially inwardly extending portion contactable with said rotary shaft.

12. A seal device as recited in claim 2, wherein said seal member has a radially inwardly extending portion contactable with said rotary shaft.

13. A seal device as recited in claim 12, wherein a projecting portion projecting toward said lip seal is formed circumferentially continuously on a portion of said support surface of said seal member where said seal member and said lip seal are in contact with each other.

14. A seal device as recited in claim 1, wherein a projecting portion projecting toward said lip seal is formed circumferentially continuously on a portion of a support surface of said seal member where said seal member and said lip seal are in contact with each other.

15. A seal device according to claim 1, wherein said seal portion has at least a ring-shaped portion facing said fourth section, a width of said pressing portion is narrower than a width of a face of said seal portion and presses said seal portion cooperating with said fourth section; and wherein said pressing portion comprises a projecting portion, said projecting portion being sandwiched between said first section and said third section, and pressure is applied by said projecting portion cooperating with said fourth section.

16. A seal device according to claim 15, further comprising a spacer, said spacer sandwiched between said lip seal and said fourth section, said pressing portion applying pressure through said spacer cooperating with said fourth section.

17. A seal device according to claim 15, wherein an annular groove is formed along said projecting portion.

18. A seal device according to claim 16, wherein an annular groove is formed along said projecting portion.

* * * * *